United States Patent [19]

Butters et al.

[11] Patent Number: 4,649,076

[45] Date of Patent: Mar. 10, 1987

[54] SLIP COATING CHAFF

[75] Inventors: Brian C. F. Butters, Portsmouth; Ian D. Pollicott, Hayling Island, both of England

[73] Assignee: Chemring PLC, Portsmouth, England

[21] Appl. No.: 759,259

[22] Filed: Jul. 26, 1985

[30] Foreign Application Priority Data

Aug. 9, 1984 [GB] United Kingdom ................. 8420313

[51] Int. Cl.$^4$ ......................... D02G 3/00; B05D 3/02; B32B 9/00
[52] U.S. Cl. .................................. 428/361; 427/389.7; 427/389.8; 427/399; 427/407.3; 428/377; 428/389; 428/392
[58] Field of Search .............. 427/389.7, 389.8, 407.3, 427/399; 252/478, 12.4; 428/406, 359, 361, 389, 392, 377

[56] References Cited

U.S. PATENT DOCUMENTS

| 2,736,714 | 2/1956 | Tiede | 252/478 |
| 3,438,903 | 4/1969 | Prahl | 252/478 |
| 3,471,414 | 10/1969 | Faler | 252/478 |
| 3,491,055 | 1/1970 | Talley | 252/478 X |
| 3,803,056 | 4/1974 | Hart | 252/478 X |
| 4,195,114 | 3/1980 | Crosby et al. | 428/404 |
| 4,522,744 | 6/1985 | Argall et al. | 252/478 X |

*Primary Examiner*—Thurman K. Page
*Attorney, Agent, or Firm*—Wood, Dalton, Phillips, Mason & Rowe

[57] ABSTRACT

A method of providing a slip coating on aluminized glass fiber chaff is provided in which the chaff is treated by applying a boundary lubricant dispersed within an aqueous medium, the boundary lubricant containing free palmitic acid and ammonium palmitate. The aqueous medium forms a hydrated aluminum oxide on the surface of the chaff and promotes a reaction between the surface oxide and the palmitic acid to provide a chemically bonded surface slip coating layer of aluminum palmitate.

10 Claims, No Drawings

SLIP COATING CHAFF

This invention relates to a method of applying a slip coating to chaff and particularly to a method of slip coating aluminised glass and to aluminised glass treated by the method. Aluminised glass is used in the manufacture of radar-reflective chaff. Such chaff may consist of hundreds of thousands of aluminised glass fibres which are tightly packed together in bundles. Chaff is used to confuse and distract weapon systems which rely upon the use of radar. For example, in the event of rocket attack vessels or aircraft may use the chaff in decoy systems for defence by projecting the chaff away from the vessel or aircraft and causing the chaff to disperse to form a chaff cloud, and hence a decoy target away from the vessel or aircraft. The provision of a slip coating for the aluminised glass is primarily to act as a lubricant to aid dispersal of the aluminised glass fibres and hence produce a better or more controllable chaff cloud. In addition it aids in the cutting to length of the fibres and resists corrosion.

In the past aluminised glass chaff has been provided with a slip coating by immersing hanks of fibres in a heated solution of stearic acid dissolved in naphtha solvent, drying the treated hanks with forced air circulation in an evaporation chamber and then curing the hanks in a oven. However, a problem with that method is that the naphtha solvent is expensive, inflammable, and can present health risks.

An object of the present invention is to provide an improved method of slip coating aluminised glass and which enhances chaff dispersal.

According to the present invention there is provided a method of providing a slip coating on chaff comprising the chemical modification of the surface of the chaff by the application to the chaff of a boundary lubricant dispersed within an aqueous medium. Preferably the boundary lubricant comprises a fatty acid and a surfactant which, in the preferred arrangement, is a salt of the fatty acid. The invention also includes a method of slip coating aluminised glass comprising the steps of:

melting the fatty acid by contacting it with water preheated to a temperature above the melting point of the fatty acid and with a base to produce a slip coating medium containing free fatty acid and salt formed by the acid and the base;

maintaining the slip coating medium above a predetermined temperature;

applying the slip coating medium to the aluminised glass; and drying the coated aluminised glass.

The base is preferably ammonia.

More particularly there is provided a method of slip coating aluminised glass fibres comprising the steps of:

melting a fatty acid by contacting it with water preheated to a temperature above the melting point of the fatty acid;

dissolving an amount of ammonia in water;

mixing the ammonia and the acid dispersion to produce a slip coating medium containing free acid and ammonium salt;

maintaining the slip coating medium at a temperature above 30° C.; maintaining the slip coating medium in contact with the aluminised glass for sufficient time to apply the slip coating thereto; and drying the coated aluminised glass.

Preferably, the ammonia is mixed with water separately and then mixed with the acid dispersion. Also, in the preferred embodiment, the slip coating solution is applied by immersing the aluminised glass in a slip coating bath.

The fatty acid is preferably predominantly palmitic acid and the melting water is demineralised water preheated to between 80°–90° C. The slip coating solution should preferably have a concentration of greater than 0.02% wt/vol. of palmitic acid to water.

Suitably the aluminised glass is prepared in hanks which are suspended in the slip coating solution. The hanks may be dried by draining, spinning in a centrifuge and then curing in an oven at about 115° C.

In an alternative arrangement the slip coating may be applied by spraying suitably at the time of the formation of the aluminised glass.

The method may include the additional steps of wrapping the aluminised glass and cutting to length to form bundles of radar-reflective chaff.

The invention also includes chaff including a slip coating applied by the above method in particular aluminised glass fibre chaff having a slip coating comprising a chemically bonded surface layer of aluminium palmitate.

The invention will now be described by way of example with reference to the preferred treatment methods. In the preferred method hanks of aluminised glass to be slip coated—normally 780,000 or 390,000 fibre hanks weighing 1.60 Kg and 0.80 Kg respectively, and 1371.6 mm long—are used. One end of a hank is then securely held together with a non-release ratchet lock nylon bale tie under which a steel hook may engage to suspend the hank during immersion in a treatment bath and during drying as will be explained. The hanks are drawn into respective "snakeskin" covers to hold the fibres together during treatment with the fibres hanging parallel to one another and free of snags. The fibres themselves will have satisfied the necessary criteria specification for aluminised glass chaff as to examination with regard to:

(a) D.C. Resistivity
(b) Visual Coating check
(c) metal coated diameter
(d) Bare glass diameter
(e) metal coating thickness However, the technical specification of the aluminised glass before it is treated is the same as previously and therefore no details in this respect are provided.

Once the hanks have been prepared a slip coating bath is made up. This is done by dissolving 7.03 Kg of commercial grade palmitic acid in 181 liters of demineralised water. The palmitic acid used preferably has the following properties and composition.:

| Chemical Composition | |
| --- | --- |
| Palmitic Acid | 90% minimum |
| Stearic Acid | 8% maximum (typically 2-2.5%) |
| Myristic Acid | 4% maximum |
| Chemical and Physical Properties | |
| Acid Value | 216/220 |
| Saponification Value | 216/221 |
| Iodine Value (WIJS) | 1.0 maximum |
| Titre | 53° C. minimum |
| Unsaponifiable | 1.0% maximum |
| Mean Molecular Weight | 257 |
| Color Lovibond 5¼" Cell | Yellow 3 Red 0.5 maximum |

The water is preheated to between 80°–90° C. and the solution is stirred vigorously until all the acid has melted.

Then 806 ml of 0.89 S.G. Ammonia is dissolved in 10 liters of demineralised water, and this solution added to the acid solution. Preferably the ammonia solution used will have a concentration of nominally 35% w/w and a specific gravity of 0.88. This is commonly described as "880/890 ammonia, about 35% $NH_3$". The maximum limits of impurities as % w/w will be typically:

| | |
|---|---|
| Non-volatile matter | 0.01% |
| Chloride | 0.001% |
| Sulphate | 0.002% |
| Arsenic | 0.00002% |
| Iron | 0.0001% |
| Lead | 0.0001% |

The ammonia solution is added below the surface level of the acid solution, preferably into the vortex produced by the stirrer. The reaction is complete when all the ammonia has been added, and a soapy white viscous solution is formed.

The slip coat solution now produced is transferred into a dip tank and is make up to a suitable level in the tank e.g. to 908 liters by the addition of cold demineralised water although the temperature should be controlled so that the temperature of the solution during the slip coating process does not fall below 30° C.

In order to slip coat the aluminised glass hanks a plurality of the hanks are suspended by their respective hooks on a rack and lowered into the dip tank. The hanks are left fully immersed in the solution for about 20 minutes. At the end of this period the hanks are removed from the dip tank and left to drain into the tank for about 30 minutes.

The hanks are then taken away from the dip tank and transferred to a high speed centrifuge and spun at 1450 rpm for 2 minutes. This centrifuge has a minimum drum diameter of 36" so that a maximum of thirty hanks may be placed in the centrifuge at any one time.

Upon removal of the hanks from the centrifuge the hanks are placed on horizontal racks in a curing oven and cured at 115° C.±5° C. for 1½ hours. The hanks are then removed from the oven and allowed to cool at room temperature on the horizontal racks. Once cooled the hanks are either stored in boxes or transferred to a cutting and wrapping station where the aluminised glass fibres are wrapped and cut to length to form chaff bundles in known manner.

The manner described by way of example is a preferred method and uses both free palmitic acid and ammonium palmitate. In the method it is believed that the slip coating applied results from the reaction of aluminium oxide which is found naturally on aluminium (or the hydrated oxide) with the free palmitic acid solubilised by the palmitate ion. This results in the formation of a chemically bonded surface layer of aluminium palmitate.

The reaction occurring is:

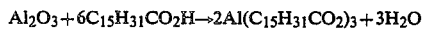

$$Al_2O_3 + 6C_{15}H_{31}CO_2H \rightarrow 2Al(C_{15}H_{31}CO_2)_3 + 3H_2O$$

Carrying out the reaction in an aqueous medium is beneficial due to the formation of hydrated aluminium oxide on the surface which helps with the reaction between the oxide and the palmitic acid to give a surface bond.

The treatment conditions are those preferred for providing an improved slip coating however they may be varied whilst still producing satisfactory coating. For example:

(a) The bath may have a minimum concentration of palmitic acid/demineralised water solution of 0.02% wt/vol;

(b) the water used to melt the palmitic acid must be heated to above 63° C., the melting point of the palmitic acid. However, since the temperature of the final solution determines how long it will remain stable, the temperature of the preheated water in the preferred method is chosen such that the final operating temperature of the bath is above 30° C. and preferably in the region of 35° C.–45° C.; and (c) the immersion time is determined for providing a good coating at the operating temperature but this may be varied within limits.

In an alternative arrangement the slip coating may be applied by in-line spraying. In this arrangement the slip coat solution is prepared as for the dip process, but is then raised in temperature above 70° C. This increases the rate of reaction.

The hot slip coat solution is applied to the aluminised glass by spraying as the glass is being drawn onto a take-up drum during the formation of the glass using a fine spray to coat the aluminised glass. The quantity of the slip coat used by this method of application (1l per hank) is much reduced from that used in a dip (6l per hank assuming the solution is discarded after each dip).

In this embodiment, since the slip coat is applied to the aluminised glass whilst it is being wound onto a fast spinning take-up drum, excess solution is spun off which means that the aluminised glass hank is also partially dried when it is taken off the drum. Thus the hank is ready to be placed directly into the drying oven without the need for further intermediate drying.

The slip coating of the present invention prevents "end-weld" between fibres when the fibres are cut to length, resists corrosion and primarily aids in chaff dispersal by providing better sliding characteriestics between individual fibres. This may mean that greater control can be obtained in the formation of chaff clouds. Although the invention is primarily applicable to chaff in the form of aluminised glass, the slip coat may be applied to other forms of chaff such as aluminium foil or aluminium wire or filament.

We claim:

1. Aluminized glass fibre chaff having a slip coating comprising a chemically bonded surface-layer of aluminium palmitate.

2. A method of providing a slip coating on aluminium chaff or aluminium coated chaff by the chemical modification of the surface of the chaff, the method comprising the steps of:

contacting a fatty acid with water and a base to form a salt with a portion of the fatty acid, so as to obtain a slip coating medium containing free acid and the salt; and applying the slip coating medium to the chaff to form a chemically bonded surface layer of an aluminium salt of the acid.

3. A method according to claim 2 wherein the fatty acid is melted by contacting it with water preheated to a temperature above the melting point of the fatty acid.

4. A method according to claim 2, wherein the fatty acid is palmitic acid, and the base is ammonia.

5. A method according to claim 2, wherein the slip coating is applied by immersion in a coating bath.

6. A method according to claim 2 wherein the chaff is aluminized glass fibers and the slip coating is applied continuously to the aluminised glass fibres during manufacture, which fibers are subsequently cut to length to form said chaff.

7. A method of slip coating aluminized glass fibers comprising the steps of:
- melting a fatty acid by contacting it with water preheated to a temperature above the melting point of the fatty acid to produce an acid dispersion;
- dissolving ammonia in water;
- mixing the ammonia and water with the acid dispersion to produce a slip coating medium containing free acid and ammonium salt;
- maintaining the slip coating medium at a temperature above 30° C.;
- maintaining the slip coating medium in contact with the aluminised glass for sufficient time to apply a slip coating thereto; and
- drying the coated aluminised glass.

8. A method according to claim 2 wherein the fatty acid comprises a minimum of 90% palmitic acid, a maximum of 8% stearic acid and a maximum of 4% myristic acid.

9. A method according to claim 7, comprising the additional steps of wrapping the aluminized glass and cutting to length to form bundles of radar reflective chaff.

10. Aluminium chaff including a slip coating applied by the method of claim 2.

* * * * *